Figure 1:
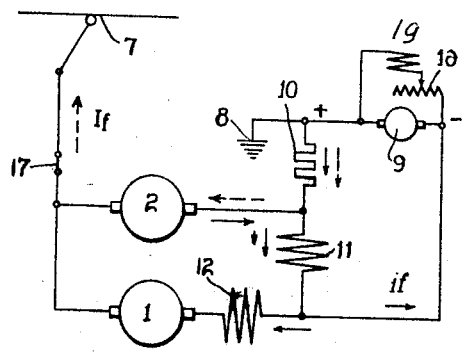

Oct. 14, 1924.

E. A. BINNEY 1,511,391

CONTROL OF ELECTRIC MOTORS

Filed Jan. 12, 1923　　2 Sheets-Sheet 1

WITNESSES:
H. B. Funk.
C. W. Shaw.

INVENTOR
Eric Alton Binney.
BY
Wesley G. Carr
ATTORNEY

Oct. 14, 1924.                    E. A. BINNEY                    1,511,391
                            CONTROL OF ELECTRIC MOTORS
                         Filed Jan. 12, 1923        2 Sheets-Sheet 2
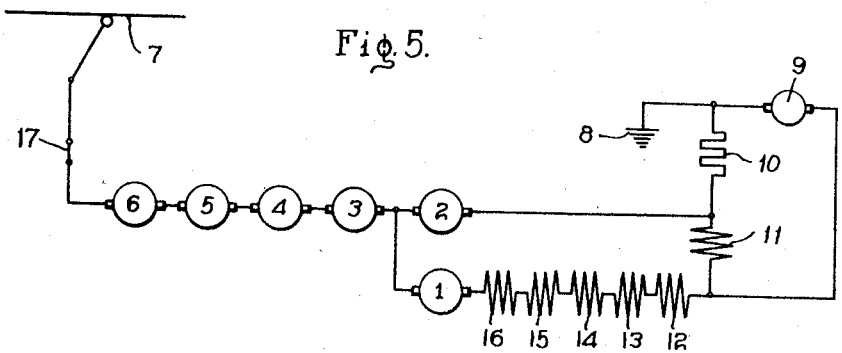
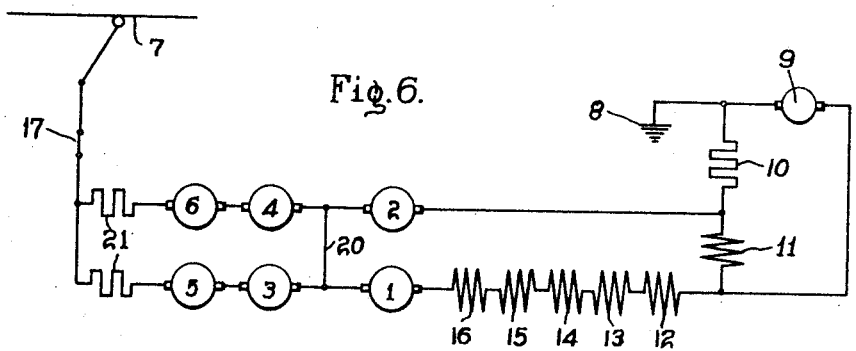
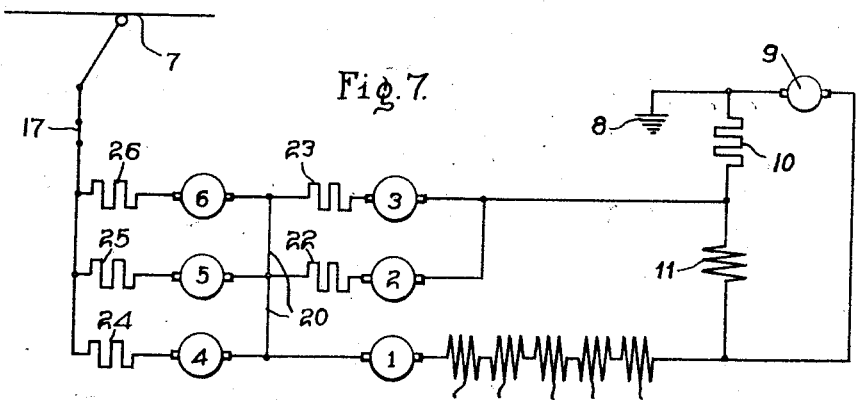
WITNESSES:                                              INVENTOR
*H. O. Funk.*                                        Eric Alton Binney
*C. W. Shaw.*                                              BY
                                                     *Wesley G. Carr*
                                                         ATTORNEY Patented Oct. 14, 1924.

1,511,391

UNITED STATES PATENT OFFICE.

ERIC ALTON BINNEY, OF SHEFFIELD, ENGLAND, ASSIGNOR TO WESTINGHOUSE ELECTRIC AND MANUFACTURING COMPANY, A CORPORATION OF PENNSYLVANIA.

CONTROL OF ELECTRIC MOTORS.

Application filed January 12, 1923. Serial No. 612,274.

*To all whom it may concern:*

Be it known that I, ERIC ALTON BINNEY, a citizen of the United States of America, and a resident in Sheffield, in the county of York, England, have invented a new and useful Improvement Relating to the Control of Electric Motors, of which the following is a specification.

This invention relates to the control of electric motors and, in particular, to arrangements for controlling a plurality of direct-current electric motors when said motors are caused to rotate by mechanical means and thereby return current to the source from which they are supplied when operating as motors. This method of operation is commonly known as regeneration and the motors are said to be acting regeneratively. It is obviously applicable to motors employed for electric traction when, for example, a motor driven vehicle is moving downhill or when it is desired to bring the vehicle to rest.

According to the present invention the controller, which may be either manually operated or of the kind in which the various switches are actuated electrically or electropneumatically, is arranged when the motors are required to operate regeneratively to close a series of switches in such positions that one motor is connected to excite the other motor or the other motors and also to excite itself, its own excitation being increased by the use of an auxiliary generator or booster. A stabilizing resistance is also included in the regenerative circuit, that is to say between the terminals of the motors and the line.

According to one example of the system as applied to two motors only, the armatures of the motors are connected in parallel, their high potential terminals being connected to the high potential line conductor through the usual trolley for example. The field windings of the motors are connected so as to form a closed circuit with the armatures and in such a manner that the correct polarity is obtained when the current supplied by one of the motors, hereinafter called for convenience the exciting motor, circulates round said closed circuit. The low potential armature terminal of the second motor is connected through the stabilizing resistance to the ground or negative line conductor and the auxiliary generator or booster is connected so as to supply current through the stabilizing resistance and the field winding of the exciting motor in series, the current in said field winding assisting the current from the exciting motor.

Figure 2:
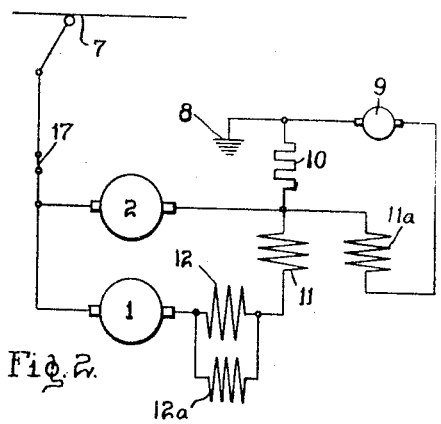
Figure 3:
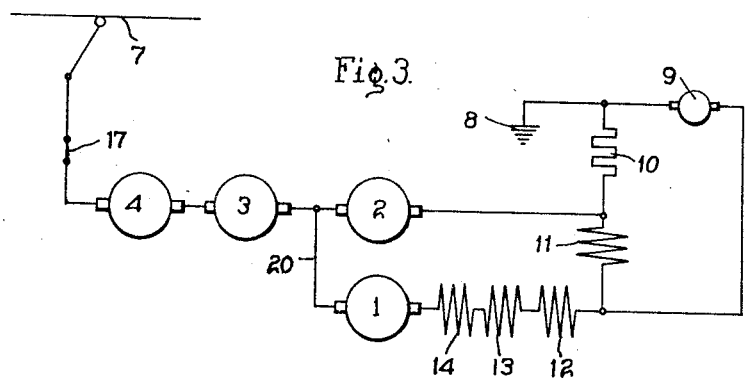
Figure 4:
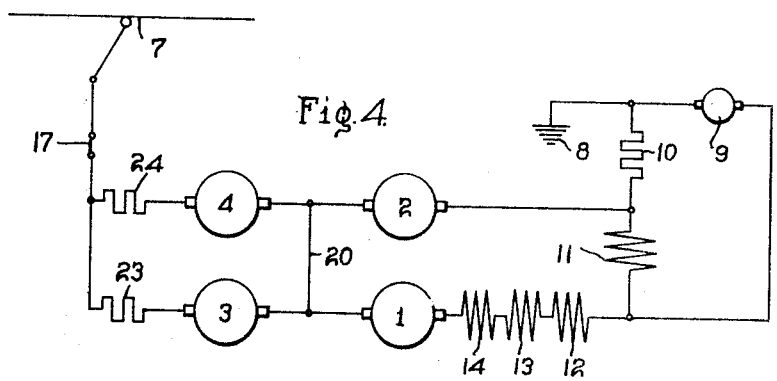

To enable the invention to be clearly understood several arrangements for carrying it into effect will now be described by way of example with reference to the accompanying drawings in which Fig. 1 is an electrical diagram of a two motor equipment connected for regeneration in accordance with the invention and Fig. 2 is a modification thereof wherein the motors each have two separate field windings. Figs. 3 and 4 are electrical diagrams of two arrangements of four motor equipments connected for regeneration in accordance with the invention. Figs. 5, 6 and 7 are electrical diagrams shewing three arrangements with six motor equipments connected for regeneration in accordance with the invention.

In the several figures of the drawings, 1, 2, 3, 4, 5 and 6 represent the armatures of the several motors and 11, 12, 13, 14, 15 and 16 the respective field windings thereof. The supply conductors, for example trolley and ground or rail, are indicated respectively at 7 and 8. The auxiliary generator, hereinafter referred to as the booster, is indicated at 9 and the stabilizing resistance is indicated at 10.

Referring first to Fig. 1 the armatures 1 and 2 of the two motors are connected in parallel with their high potential terminals connected through the usual line switch 17 to the trolley or supply conductor 7. The respective field windings 11 and 12 of the motors are connected so as to form a closed circuit with the armatures and in such manner that the correct polarity is obtained when the current supplied by one of the motors, for example the motor 1 which will be hereinafter for convenience called the exciting motor, circulates round said closed circuit in the direction of the long arrows designated $I_f$. The low potential terminal of the armature 2 is connected through the stabilizing resistance 10 to ground or negative supply conductor 8 and the auxiliary generator or booster 9 is connected so as to supply current through the stabilizing resistance 10 and the field winding 11 of the exciting motor in series, the current in said field winding 11 assisting the current from the exciting motor armature 1 as indicated by the short arrows designated $i_f$. A rheostat 18 is provided for varying the excitation of the field winding 19 of the booster 9.

When the motors are connected in the manner above described, assuming for the moment that the line switch 17 is open, the exciting motor will generate a higher voltage than the second motor and the current flowing through the exciting motor armature 1 and therefore the field 12 of the other motor can be adjusted by varying the voltage of the booster 9 by adjusting the rheostat 18 until the voltage generated by the second motor 2 is equal to the line voltage. The exciting motor 1 will simply generate the current circulating in the closed motor circuit and the braking effect will be equal to the total losses occurring in the circuit together with the power required to drive the booster.

When the line switch 17 is closed the braking effect will be equal to the power absorbed in returning current to the line regeneratively, that is, if the exciting motor generates a current $I_f$ and a current $I_1$ indicated by the dotted arrow is returned to the line, $I_1$ being smaller than $I_f$, the second motor will be driven as a motor by means of the first motor which is acting as a generator but the current in the second motor is equal to $I_f - I_1$. The braking effect of the exciting motor is $I_f$ so the braking effect of the two motors is $I_1$.

If now for any reason the regenerated current is increased so that $I_1$ becomes larger than $I_f$ the current in the second motor is equal to $I_f - I_1$ which has a negative value, that is to say the second motor acts as a generator and supplies current equal to $I_1 - I_f$ to the line. Both motors are now acting as generators and the total braking effect is again equal to $I_1$ since the braking effect of the exciting motor is proportional to $I_f$ as before and that of the second motor is proportional to $I_1 - I_f$, the sum of which is equal to $I_1$. It will be understood that the regenerated current $I_1$ may increase until the second motor carries its rated load, the current in the exciting motor remaining substantially constant and equal to $I_f$.

The stabilizing resistance 10 which carries current equal to the sum of the current returned to the line and to that generated by the booster 9, namely $I_1 + i_f$ will act to prevent sudden changes in the regenerated current due to variation in line voltage or from other causes. Stabilizing resistances are well known in connection with motor control systems operating regeneratively so that a full description of the function thereof is considered unnecessary.

With the above described arrangement it will be appreciated that a total generating capacity equal to the full capacity of the second motor and in addition the exciting current generated by the exciting motor is obtainable and since in most cases the current $I_f$ constitutes a large proportion of the rated capacity of the equipment the latter is capable of regenerating nearly the full current to which it is rated.

Furthermore it will be appreciated that the capacity of the booster 9 is determined by the voltage drop across the stabilizing resistance 10 and the field winding 11 of the first motor and by the supplementary exciting current $i_f$ provided by the booster. Since the stabilizing resistance 10 will generally be only a small fraction of the resistance of the field winding 11 the total voltage drop is less than the voltage drop across all of the field windings. Furthermore the booster current $i_f$ is but a fraction of the field current $I_f$. Hence the capacity of the booster is but a small proportion of the total exciting energy required by all the motors.

Referring now to Fig. 2 which illustrates an arrangement wherein each motor has two separate field windings namely 11 and 11$^a$, 12 and 12$^a$ such as are sometimes employed in certain methods of controlling motors in which the excitation is varied by changing the number or positions of the field winding or both in circuit, one portion namely the portion 11$^a$ of the field winding of the exciting motor 1 may be supplied with current from the booster 9 whilst the other portion 11 of said field winding carries the main exciting current. Both field windings 12 and 12$^a$ of the second motor are preferably connected together in parallel as shown.

It will be understood that in the arrangement according to Fig. 2 as well as in the remaining figures the booster 9 may be provided with rheostatic field control as described in connection with Fig. 1.

In equipments comprising four motors the controller may be arranged so as to bring about the connection of the first two motors 1 and 2 in the manner already described in connection with Fig. 1 whilst the third and fourth motors may have their armatures 3 and 4 connected in series between the high potential terminals 20 of the parallel connected armatures and the line 7, the field windings 13 and 14 of the said third and fourth motors being excited by the exciting motor 1 and being included in circuit therewith as clearly shown in Fig. 3.

Instead of the series arrangement of the motor armatures 3 and 4 as shown in Fig. 3 the said armatures 3 and 4 may be connected in parallel between the high potential terminals 20 of the first and second motor armatures and the line 7 as clearly shown in Fig. 4. Resistances 23 and 24 may be inserted between the armatures 3 and 4 respectively and the line 7 for balancing purposes as will be well understood.

The parallel connection of the motors 3 and 4 provides a higher speed than the series connection of said motors shown in Fig. 3 and it will be obvious that a greater regenerative power may be obtained with the parallel connection of the armatures 3 and 4 since the current that can be taken from the motors is the field current together with the returned current of one motor whereas in the series arrangement shown in Fig. 3 the returned current of one motor only determines the permissible output.

Arrangements equivalent to those described in connection to Figs. 3 and 4 wherein four motors are employed may be used in equipments having six or more motors. Thus in Fig. 5 the armatures 1 and 2 are connected in parallel as already described in connection with Fig. 1, whilst the armatures 3, 4, 5 and 6 of the remaining motors are connected in series. In Fig. 6 the motors 3 and 5 and 4 and 6 are connected respectively in series and these pairs of motors are connected in parallel between the high potential terminals 20 of the motors 1 and 2 and the line 7, suitable, balancing resistances 21 being provided. Furthermore, in Fig. 7 the armatures 2 and 3 are connected in parallel and are provided with resistances 22 and 23 respectively, said motors being excited as before by the exciting armature 1, the remaining motor armatures 4, 5 and 6 being connected in parallel between the high potential terminals of the motor armatures 1, 2 and 3 and the supply conductor 7 corresponding balancing resistances 24, 25 and 26 respectively being provided as before.

It will be understood that various modifications may be made without departing from the scope of the invention. For example, in some cases the armatures of two motors may be connected in series or parallel for exciting the remaining motors. Instead of using a stabilizing resistance, other well known methods of obtaining stability of control may be employed if desired. For example the regenerated current may be caused to pass through a series winding provided on the auxiliary exciter or booster, such series winding being arranged to decompound the machine so that upon a sudden increase in regenerated current the exciter field is reduced and the regenerated current thus limited.

I claim as my invention:—

1. For a motor control system of the kind set forth, the method of obtaining regenerative operation which consists in causing one or more of the motors to excite the other motor or motors and to be self-exciting and in increasing the excitation of the exciting motor or motors from a separate source of current.

2. In a control system, the combination with a supply circuit, a plurality of dynamo-electric machines adapted for regenerative operation, of means for connecting one of said machines to excite the remainder and to also be self-exciting, and means comprising a source of energy other than said supply circuit for varying the excitation of said exciting machine.

3. In a control system, the combination with a plurality of dynamo-electric machines adapted for regenerative operation, of means for connecting one of said machines to excite the remainder and to also be self-exciting and means comprising an auxiliary generator for varying the excitation of said exciting machine.

4. In a control system, the combination with a plurality of dynamo-electric machines adapted for regenerative operation, of means for connecting the armature of one of said machines in parallel relation to one of the other motor armatures and to excite its own field winding and also the field windings of all the other machines, and a source of energy also connected to the field winding of the exciting machine.

5. In a control system, the combination with a plurality of dynamo-electric machines adapted for regenerative operation, of means for connecting the armature of one of said machines in parallel relation to one of the other motor armatures and to excite its own field winding and also the field windings of all the other machines, and an auxiliary generator also connected to the field winding of the exciting machine.

6. In a control system, the combination with a plurality of dynamo-electric machines adapted for regenerative operation, of means for connecting the armature of one of said machines in parallel relation to one of the other motor armatures and to excite its own field winding and also the field windings of all the other machines, a supply circuit for said machines, a stabilizing resistor connected between the low-voltage terminal of an excited machine and one supply-circuit conductor, and a source of energy connected to supply energy through said resistor to the field winding of the exciting machine.

7. In a control system, the combination with a plurality of dynamo-electric machines adapted for regenerative operation, of means for connecting the armature of one of said machines in parallel relation to one of the other motor armatures and to excite its own field winding and also the field windings of all the other machines, a supply circuit for said machines, a stabilizing resistor connected between the low-voltage terminal of an excited machine and one supply-circuit conductor, and an auxiliary generator connected to supply energy through said resistor to the field winding of the exciting machine.

In testimony whereof I have hereunto subscribed my name this 15th day of December, 1922.

ERIC ALTON BINNEY.